H. LABORENZ.
APPARATUS FOR MAKING CHAIN MAIL WORK.
APPLICATION FILED APR. 21, 1910.
997,453.
Patented July 11, 1911.
2 SHEETS—SHEET 1.
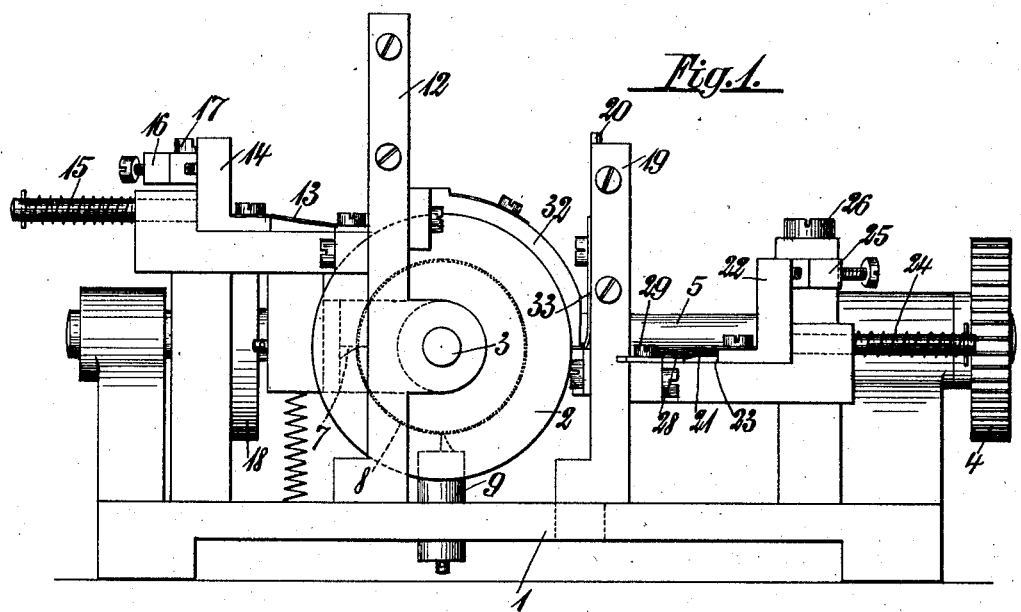
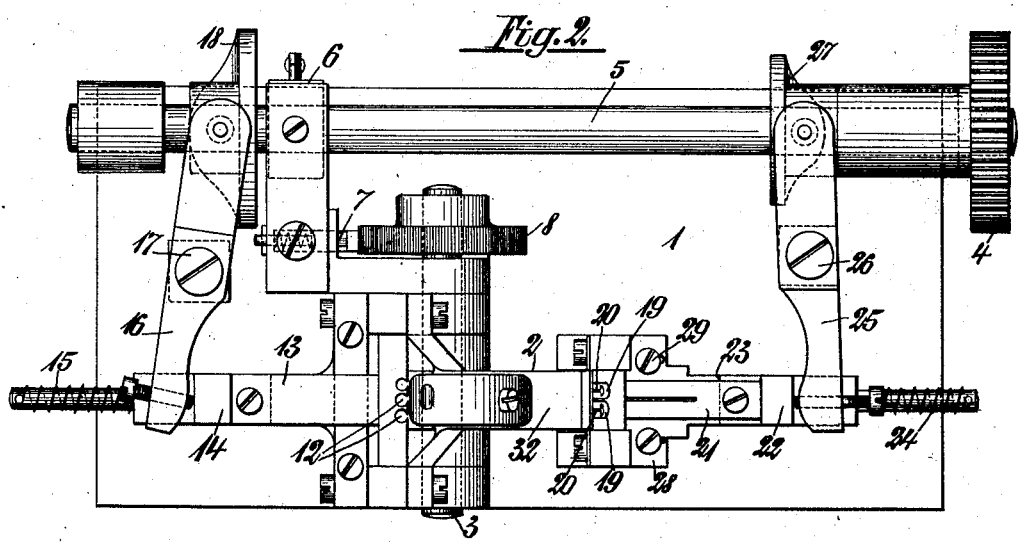
WITNESSES:
INVENTOR,
HUGO LABORENZ,
by
Attorney.

H. LABORENZ.
APPARATUS FOR MAKING CHAIN MAIL WORK.
APPLICATION FILED APR. 21, 1910.
997,453.
Patented July 11, 1911.
2 SHEETS—SHEET 2.
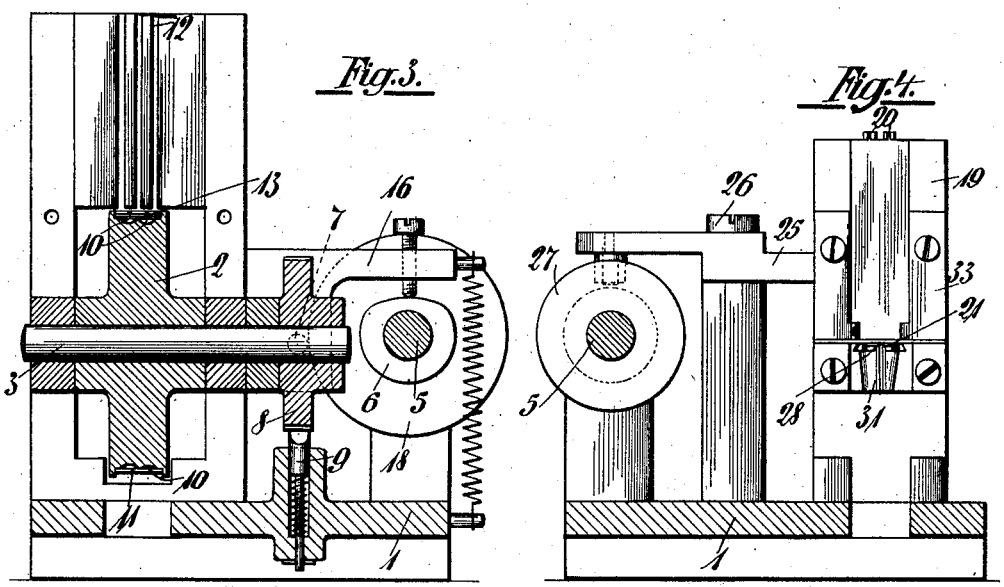
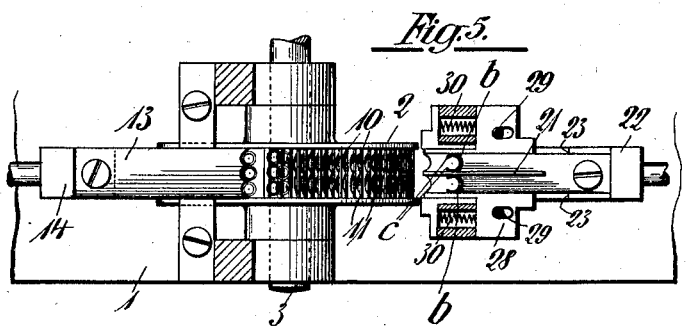
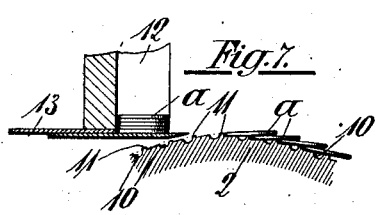
WITNESSES:
INVENTOR,
HUGO LABORENZ

UNITED STATES PATENT OFFICE.

HUGO LABORENZ, OF PFORZHEIM, GERMANY.

APPARATUS FOR MAKING CHAIN-MAIL WORK.

997,453.     Specification of Letters Patent.     Patented July 11, 1911.

Application filed April 21, 1910. Serial No. 556,662.

*To all whom it may concern:*

Be it known that I, HUGO LABORENZ, a citizen of the German Empire, residing at Pforzheim, in the Grand Dukedom of Baden, Empire of Germany, have invented certain new and useful Improvements in Apparatus for Making Chain-Mail Work; and I do hereby declare the following to be a full, clear, and exact description of the invention, such as will enable others skilled in the art to which it appertains to make and use the same.

This invention relates to an apparatus for making chain mail, such as is more particularly employed for hand bags, purses and the like.

Now this invention relates to an apparatus by means of which the manufacture of such chain-mail work can be carried out entirely mechanically, so that it is very considerably simplified. It is only necessary for the links or members from which the chain-mail work is made, to be inserted (arranged in order) into the apparatus, whereupon the chain-mail work or rather strips of the same are formed quite automatically.

In chain-mail work in which, for instance, four rings are connected together by means of a fifth ring, the rings lying piled up one upon another in rows in the apparatus are by the present invention automatically conveyed from the pile by means of a pusher or the like to a conveyer member, for instance, an intermittently revolving drum. On this they lie by means of abutments in such a way that they overlap one another, that is to say, they lie in rows on the conveyer member side by side after the manner of scales. By this conveyer they are then conveyed to an apparatus, which pushes the connecting rings, which are also piled up in rows, and must have an open joint, with this joint over the crossing points of the other rings which are lying ready and which may be closed ones. The conveyer member is so recessed that the connecting rings are completely closed by being pressed into these recesses. The operation of the pusher and the conveyer drum is effected by machinery, so that the entire apparatus in this way works mechanically.

The invention will now be more particularly described in connection with the accompanying drawings, which show some forms of construction as an example.

In these drawings:—Figure 1 is a front view; and Fig. 2, a plain view of the improved apparatus; Figs. 3 and 4 are sectional views of the same; while Fig. 5 is a horizontal section of the apparatus; Fig. 6 shows the finished chain work; while Fig. 7 is a section showing the mounting of the links on the conveyer drum; Fig. 8 is a view of an open ring.

A conveyer member 2 is located in a frame 1, and brings the rings $a$ which are to be connected and which may be closed rings, to an apparatus which pushes the fifth rings $b$, which serve for connecting the other rings and which are open and have a joint $c$, over the crossing points of the first pair of rings. The drum 2 is mounted on a shaft 3 and is rotated from a driving mechanism 4 by means of a cam 6 on the driving shaft 5, the periodic forward movement being obtained by means of a pawl 7 acting on a ratchet wheel 8 which is mounted on the shaft 3 of the drum 2, while a pawl 9 prevents its turning back.

The rings $a$ lie in piles in tubes 12 in the machine frame 1, and there are at least two such tubes 12 side by side, but of course the number of them may be suitably larger. The lowermost rings $a$ of each row are fed by a pusher 13 to the transport drum 2, this pusher 13 being arranged on a carriage 14 which slides in the machine frame 1, the movement being derived from the driving gear by means of a cam 18, mounted on the driving shaft 5 and acting on a lever 16 which is under the action of a spring 15 and is pivoted at 17. By the action of the apparatus the two lowermost rings $a$ are brought onto the conveyer drum 2, while it is stationary. This drum is provided with projections or abutments 11 for receiving the rings $a$ in the correct position, the projections being of such a shape that they rise obliquely, for instance, so that the rings when on the drum 2 overlap one another like scales (Figs. 5 and 7). By this means the rings $a$ are brought into such a position that each four may be connected by the fifth ring $b$. These rings $b$ lie in tubes 19 which are provided with guides 20 over which the gaps or joints c of the rings b are pushed, so that the rings are prevented turning and they lie with the gap toward the conveyer drum 2. These fifth rings b are, in similar manner to the rings a, taken by a pusher 21 from the pile and moved toward the conveyer drum 2. The pusher 21 is also moved forward by the driving gear 4 and by means of cam 27, which is mounted on the driving shaft 5 and moves a lever 25 which turns on a pivot 26. On the rotation of the shaft 5 the lever 25 is moved forward against the action of a spring 24 and presses the pusher 21 toward the conveyer wheel, so that the lowermost ring is taken from the pile and moved forward. When the pusher 21 has moved forward sufficiently, it encounters by means of abutments 23 the pusher 28 and takes it with it, whereby the rings b are completely closed. This conveyer drum 2 is provided with depressions 10 for closing the rings, which depressions, for instance in the case of round rings, are preferably circular in form, so that the ends of the rings are pressed together and the joints closed. Now in order to effect this closing in the most complete manner and to avoid the rings escaping when being closed, the further pusher 28 is provided, which is guided by guide slots in pins 29 and is under the action of springs 30. A flat spring 33 is also provided which bears from above on the operating surface against the rings b, so that these also can not escape upward. Set screws or the like may also be provided on the levers 16 and 25, in order to regulate the forward movement of the pushers 13 and 21. The finished chain work then passes down chutes or passages 31 in the machine frame 1 to the outside. Further, a cover 32 is provided over a part of the drum 2, which prevents the rings falling off, so that they remain in the correct position.

I declare that what I claim is:—

1. An apparatus for making chain mail or chain work comprising a movable member, a laying means for laying pairs of links upon said member, a presenting means for presenting split connecting links to the overlapping links and pushing the connecting links to close them.

2. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means.

3. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means, each step of the step-by-step movement being less than the diameter of the overlapping links in the direction of the movement.

4. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means, said movable member consisting of a drum provided with abutments for the links, these abutments being arranged close together so that the links constantly partially overlap.

5. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means, the laying means consisting of a tube for holding the links and a pusher for pushing the lowermost links from the tube on to the movable means.

6. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means, the presenting means consisting of a tube for holding the connecting links, a pusher for pushing the split connecting links against the movable member with the split passing over the intersection of the overlapping links and closing the split, and means for mechanically operating the pusher.

7. An apparatus for making chain mail or chain work comprising a movable member, a laying means for laying pairs of links upon said member, a presenting means for presenting split connecting links to the overlapping links and pushing the connecting links to close them, and means for moving the movable member step-by-step past the presenting means, the presenting means consisting of a tube for holding the split connecting members and having a guide for engaging in the split, and a mechanically operated pusher for pushing the connecting links against the movable means and closing the connecting links on the overlapping links.

8. An apparatus for making chain mail or chain work comprising a movable member, a laying means for laying pairs of links upon said member, a presenting means for presenting split connecting links to the overlapping links and pushing the connecting links to close them, a drive shaft, and means for operating the laying means, the presenting means, and the movable member from said shaft.

In testimony whereof I affix my signature, in presence of two witnesses.

HUGO LABORENZ.

Witnesses:
HERMAN WIETHÜCHTER.
FRANZ GAURON.

Copies of this patent may be obtained for five cents each, by addressing the "Commissioner of Patents, Washington, D. C."